UNITED STATES PATENT OFFICE.

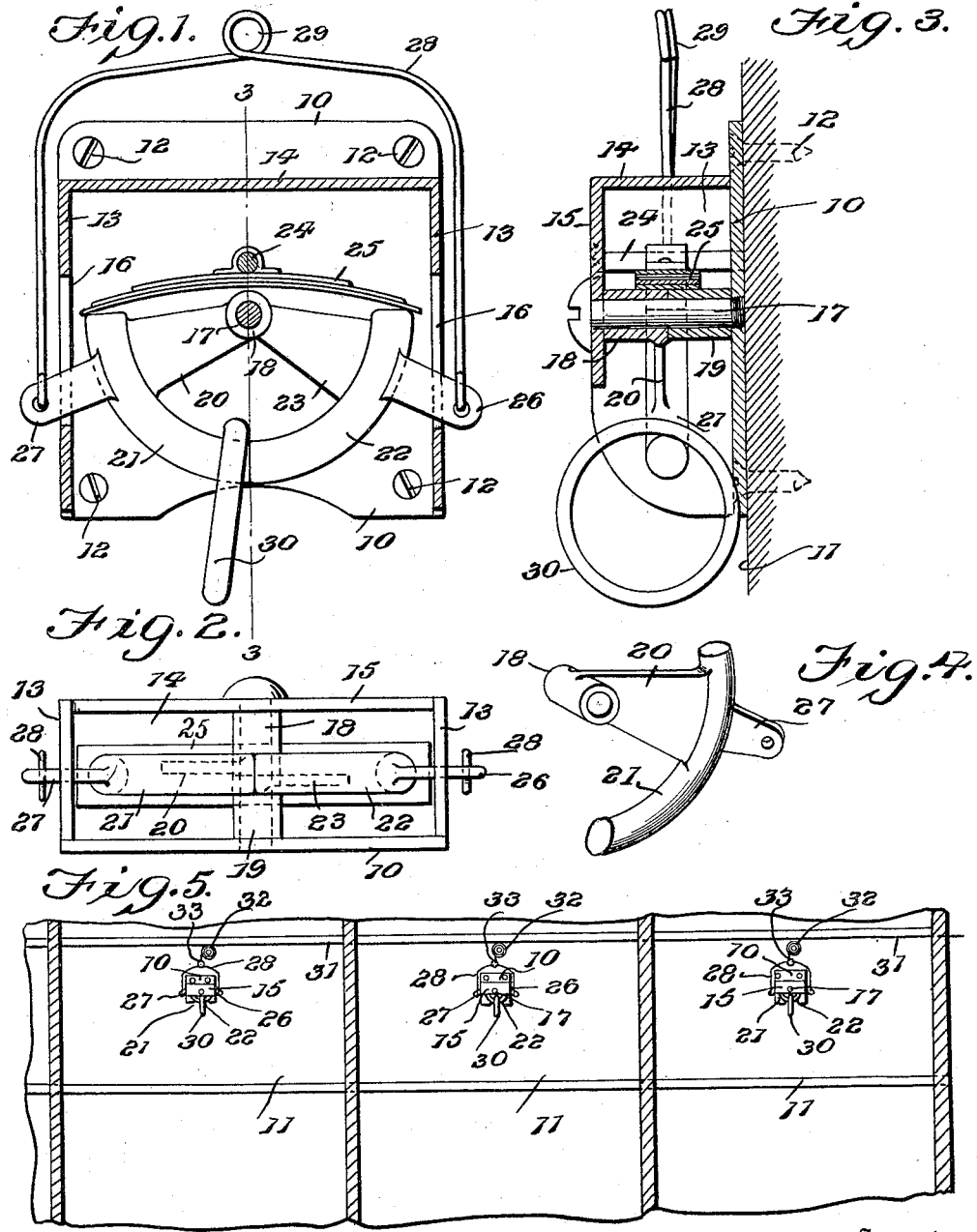

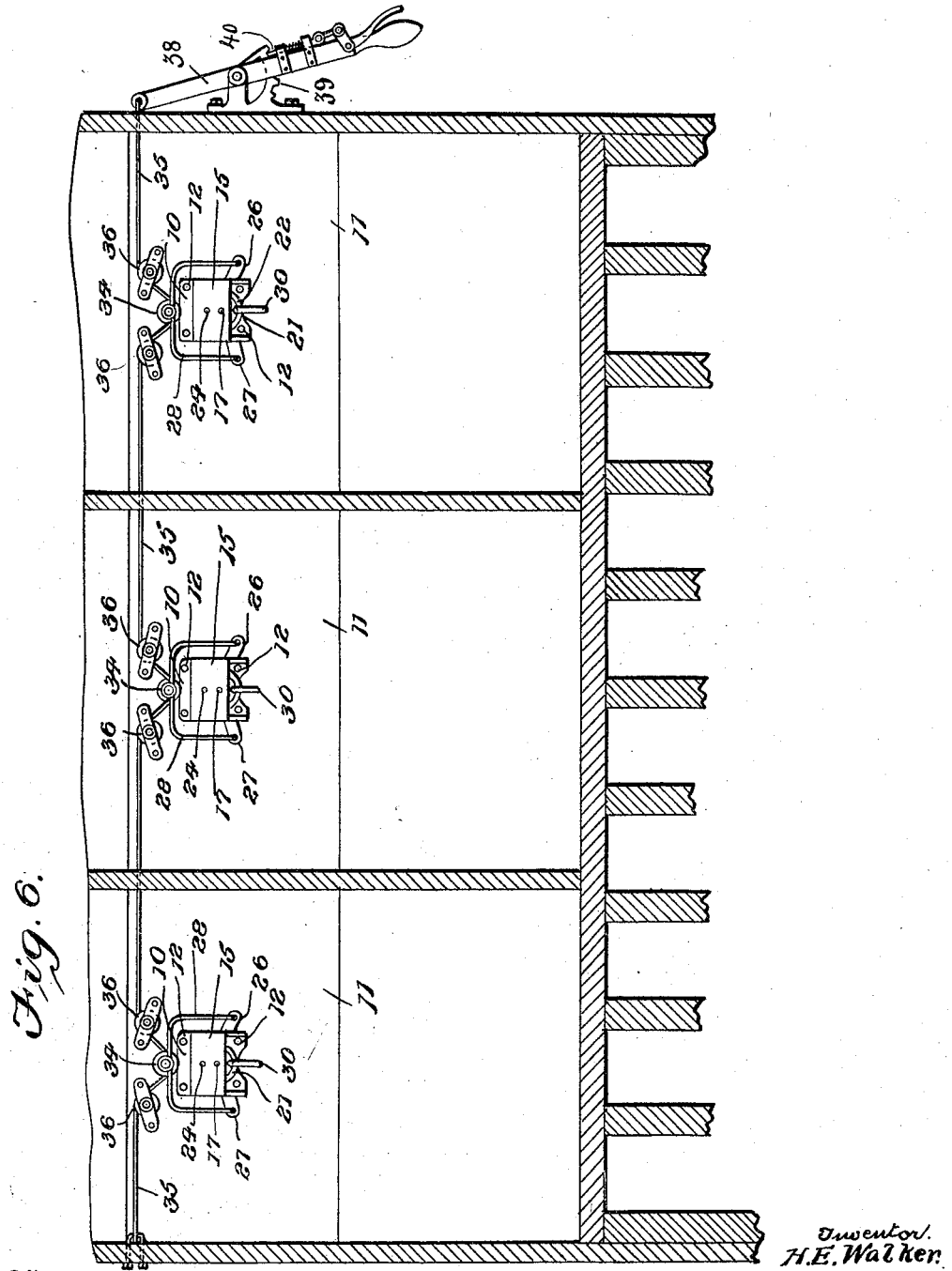

HENRY E. WALKER, OF BLISS, OKLAHOMA.

HORSE-RELEASER.

1,148,205.  Specification of Letters Patent.  Patented July 27, 1915.

Application filed December 30, 1913. Serial No. 809,510.

*To all whom it may concern:*

Be it known that I, HENRY E. WALKER, citizen of the United States, residing at Bliss, in the county of Noble and State of Oklahoma, have invented certain new and useful Improvements in Horse-Releasers, of which the following is a specification.

This invention relates to improvements in devices for releasing animals from their stalls in case of emergency, as for instance when a fire breaks out in a stable, and has for one of its objects to simplify and improve the construction and increase the efficiency and utility of devices of this character.

Another object of the invention is to provide a simply constructed device which may be applied to mangers or other portions of the stable without structural change in the stable.

Another object of the invention is to provide a device of this character wherein provision is made for releasing the animals consecutively to obviate danger of crowding or stampeding them.

With these and other objects in view, the invention consists in certain novel features of construction as hereinafter shown and described and then specifically pointed out in the claims; and in the drawings illustrative of the preferred embodiment of the invention—Figure 1 is an elevation, partly in section, of one of the improved releasing devices; Fig. 2 is a plan view of the same; Fig. 3 is a side elevation in section on the line 3—3 of Fig. 1; Fig. 4 is a perspective view of one of the swinging and releasing members; Fig. 5 is a diagrammatic view of a portion of a stable including a plurality of the stalls and mangers with the releasing devices attached, to illustrate one manner of arranging and operating the improved device; and Fig. 6 is an enlarged view similar to Fig. 5 illustrating a slight modification in the manner of operating the device.

Corresponding and like parts are referred to in the following description and indicated in all the views of the accompanying drawings by the same reference characters.

The improved device may be applied to any suitable portion of a stable or other closure for animals, but is adapted more particularly to be attached to the manger at the same locality where the ordinary hitching member is applied.

One of the improved devices will be applied to each manger, and means are provided whereby all of the releasing devices will be actuated from one single point by a single movement of a pull device, and so arranged that animals are simultaneously released, or released consecutively as may be preferred.

Each of the releasing devices comprises a base member 10 adapted to be supported at any convenient point within the stable, for instance on a manger indicated conventionally at 11, by screws or other suitable fastening devices 12. Each base member supports a casing or shell including sides 13, back 14 and top 15, the shell being preferably formed from a single sheet with the front open and the top member 15 of less width than the sides and with slots 16 in the side members 13. The shell is supported in position upon the base by a clamp member 17, preferably threaded at one end in the base. Mounted to swing upon the clamp 17 are hub portions 18—19. Connected to the hub portion 18 by a web 20 is a segmental member 21, while a similar segmental member 22 is connected to the hub 19 by a web 23. The members 21—22 are concentric to the hubs 18—19 and stem 17, and are segments of a circle and engage end to end with each other as shown. Another stud 24 extends between the top 15 of the shell and the base 10 and rearwardly of the stem 17.

A spring 25 is supported by the pin 24 and yieldably engages the rear terminals of the segmental members 21—22, and thus exerts its force to yieldably maintain the outer terminals of the segmental members in contact, as represented in Fig. 1. Projecting from the segmental member 22 is an arm 26 which extends through one of the slots 16, while a similar arm 27 extends from the segmental member 21 and through the other slot 16. A pull device, such as a bail 28, is connected to the arms 26—27 and is formed into an eye 29 rearwardly of the shell and base. By this means it will be obvious that when a pulling force is applied to the bail 28 by a pull member connected to the eye 29 the members 21—22 will be separated and caused to swing upon the stud 17 against the resistance of the spring 25, and when the pull strain is released, the springs will automatically return the segmental members to their forward and engaging position. The hitch device of the animal is connected to the members 21—22, preferably to a ring 30 or like easily detachable device.

It will be observed that when an animal is hitched to the ring 30, and the latter engaged with the members 21—22 when in their closed position, the animal will be retained in hitched relation to the manger, and no amount of pulling strain applied to the ring will cause the members 21—22 to be separated. Consequently, so long as the members 21—22 are not separated by a pull applied to the bail 28, the animals will remain in hitched relation to the manger. Then, if a pulling force is applied to the bail 28, the members 21—22 will be separated and the ring 30, together with the animal hitched thereto, released.

The device is simple in construction and accurate in action, and may be manufactured at a small expense, and applied to stables or mangers of various forms without structural change either in the manger or in the device.

The improved device does not interfere with the ordinary uses of the hitching member, as the latter can be manually engaged with or disengaged from the improved device without interfering with the releasing mechanism.

The pulling members may be connected in any suitable manner, and operated by any suitable means, but for the purpose of illustration a main pull element 31 is shown in Fig. 5 leading over guide pulleys 32 with short branch pull devices 33 connecting the bails 28 respectively with the main pull member 31. By this arrangement, the releasing devices are simultaneously actuated by pulling the member 31.

In Fig. 6, each of the bails 28 is provided with a pulley 34 and a single pull member 35 conducted over pulleys 36 spaced apart and between the pulleys 35. By this arrangement the animals may be released consecutively by properly manipulating the pull member, which may be advantageous under certain circumstances, as by the animals being released one at a time all danger of crowding or stampeding is avoided.

It will be noted that the pulleys 36 are arranged in pairs and disposed in longitudinal alinement and that the pulleys 34 are located initially or normally below the line of the pulleys 36, thereby causing a deflection in the pull cable between each pair of the pulleys 36. By this means when the lever 38 is actuated the pull cable deflection nearest the lever will first be partly straightened out and the first releasing device thereby actuated and then as the pulling action continues, the next pull cable deflection will be partly straightened out and the next releasing device thereby actuated, and so on, consecutively.

It will be obvious that with a device thus constructed and arranged the lever 38 may be moved just far enough to partly straighten out the cable deflection between the first pair of the pulleys 36 to release an animal from the nearest stall, and then stop the movement of the lever to avoid effecting the next cable deflection until the first animal has passed from the stall, and then a further slight pull imparted to the lever to release the next animal, and so on. By this means the time between each release may be readily controlled to any required extent.

When the arrangement shown in Fig. 6 is employed, the pull member will be preferably actuated from the side nearest the doorway of the stable, so that the animal nearest the door will be released first, and the remaining animals released in consecutive order, as will be obvious. The main pull element will preferably be arranged to be actuated by a pull lever 38, as shown, the latter operating over a toothed segment 39 and provided with a backing pawl 40, to enable the members 21—22 to be retained in open position against the resistance of the springs 25.

Having thus described the invention, what is claimed as new is:—

1. In an animal releaser, a supporting casing having oppositely arranged guide slots, co-acting members movable upon a common center within said casing, an arm directed laterally from each of said co-acting members and projecting respectively through said guide slots, holding means engaging said co-acting members, and means applied to said arms for moving said co-acting members to release said holding means.

2. In an animal releaser, a supporting casing having oppositely arranged guide slots, co-acting members within said casing, a pivot member extending through said casing, a hub connected by a web to each of said co-acting members and mounted for rotation upon said pivot to maintain the confronting ends of said co-acting members normally in engagement, holding means engaging said co-acting members, an arm directed laterally from each of said coacting members and projecting respectively through said guide slots, and means applied to said arms for swinging said co-acting members upon said pivot to release said holding means.

3. In an animal releaser, a supporting casing having oppositely arranged guide slots, co-acting members movable upon a common center within said casing, a spring engaging said co-acting members at one end and maintaining the other ends yieldably in engagement, an arm directed laterally from each of said co-acting members and projecting respectively through said guide slots, holding means engaging said co-acting members, and means applied to said arms for moving said co-acting members against the resistance of said springs to release said holding means.

4. In an animal releaser, a plurality of co-acting members, arranged in pairs, each pair of said members being arranged to move upon a common center, a holding device engaged by each pair of said co-acting members, coupling means connecting each pair of said co-acting members, and a pull element connected to said coupling means and operating to consecutively actuate said co-acting members and to consecutively release said holding device.

5. In a device of the class described, a plurality of guides arranged in pairs, a pull element extending over said guides, a releasing device for each pair of said guides and each including a single guide to receive the pull element between each pair of the first-mentioned guides and producing a deflection in the pull element between each pair of said guides.

6. In a device of the class described, a plurality of releasing devices, an animal holding means detachably engaging each of said releasing devices, a guide device carried by each of said releasing devices, a plurality of guide devices associated with said releasing devices, and a pull element alternately engaging the guide devices of the releasing devices and the associated guide devices, whereby the releasing devices are consecutively actuated when the puller element is operated.

7. In a device of the class described, a plurality of cable guides disposed in longitudinal alinement and arranged in pairs spaced apart, a pull cable extending over said alined cable guides, a releasing device for each pair of said cable guides and each including a cable guide to receive the pull cable between each pair of alined cable guides and producing a yieldable initial deflection in the cable between each pair of said alined cable guides.

In testimony whereof I affix my signature in presence of two witnesses.

HENRY E. WALKER. [L. S.]

Witnesses:
 GEO. L. MILLER,
 JOE FORMAN.

Copies of this patent may be obtained for five cents each, by addressing the "Commissioner of Patents, Washington, D. C."